Sept. 2, 1969  J. H. STROOP  3,464,592
ROLL-BALL DISPENSER FOR PASTE PRODUCTS
Filed June 1, 1967
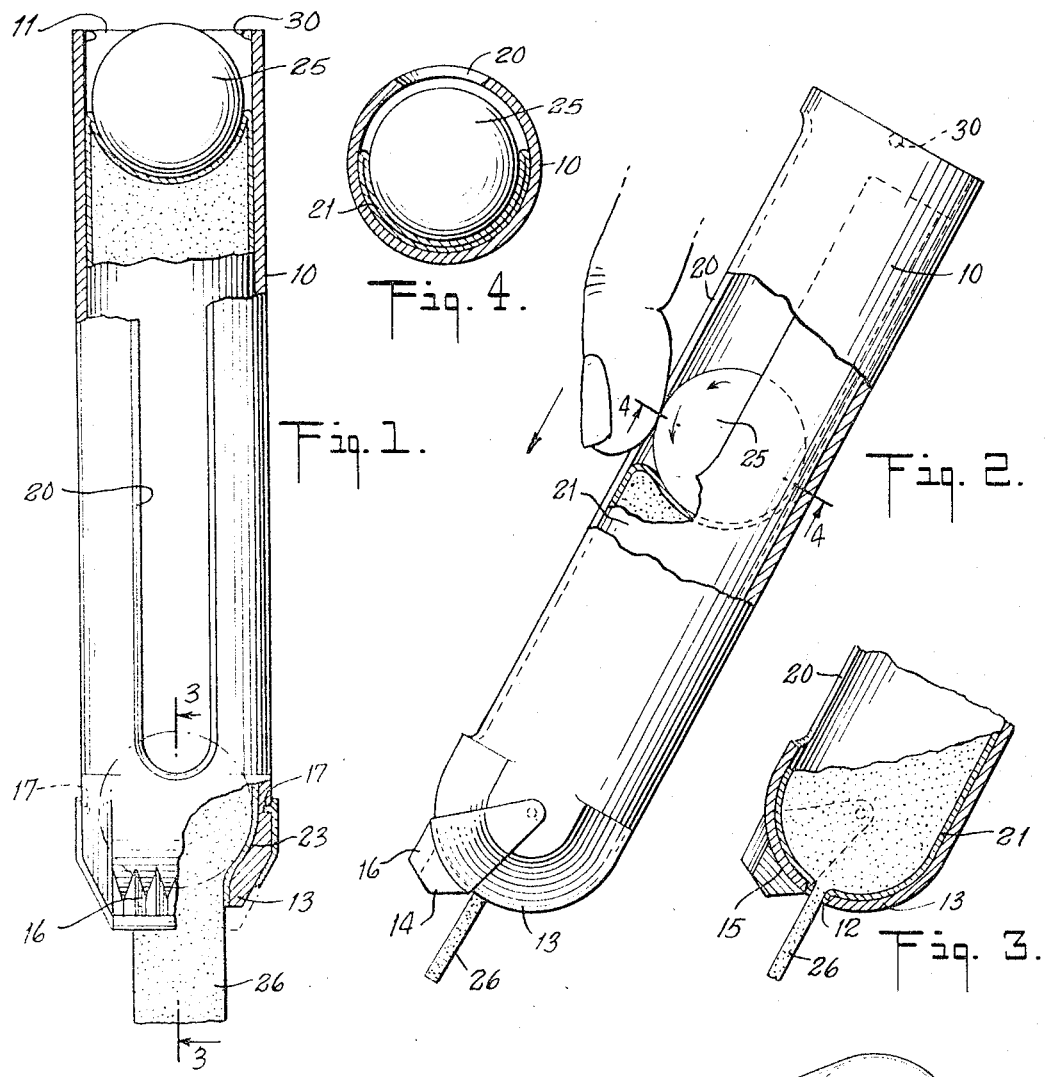
INVENTOR.
JOHN H. STROOP
BY
ATTORNEY

United States Patent Office 3,464,592
Patented Sept. 2, 1969

3,464,592
ROLL-BALL DISPENSER FOR PASTE PRODUCTS
John H. Stroop, New York, N.Y., assignor to Total
Packaging Inc., New York, N.Y., a corporation of
New York
Filed June 1, 1967, Ser. No. 642,936
Int. Cl. B67b 7/24; B65d 47/00
U.S. Cl. 222—82                                    2 Claims

ABSTRACT OF THE DISCLOSURE

Instead of the usual tubes for tooth paste and the like, which have a screw top and rely on the user to squeeze the paste out of the tube from the bottom, this invention uses a solid tube dispenser with a slot extending almost the entire length. A sealed tube cartridge of very thin material, such as polyethylene, contains the paste material to be dispensed and fits into the dispenser. An extruder roll-ball is pushed into the rear end of the dispenser and is advanced gradually by the finger of the user operating through the slot. The other end of the dispenser has a narrow slit opening through which the paste material is pushed by the extruder roll-ball. The dispenser also has a closure mounted on the dispenser and adapted to open and close the opening, and on at least one side of the center has serrations to enable the closure to act as a cutter to initially cut off the top of the cartridge. The roll-ball fits so closely into the spherical shape of the bottom of the dispenser that the entire content of the tube cartridge is extruded.

BACKGROUND OF THE INVENTION

Flexible tubes for dispensing paste products, such as for example tooth paste, peanut butter, mustard, and the like, are in general use and ordinarily in most cases have been made of metal and have at one end a screw cap which is removed and the oppoiste end of the tube is squeezed by the user to force out the desired amount of the material contained in the tube. When these tubes are nearly empty, they are thrown away and new ones purchased.

This type of device, while in very large use, has the disadvantage that the content is almost never completely dispensed and some of it is thrown away.

SUMMARY OF THE INVENTION

According to this invention, the containers are very thin, inexpensive cartridges formed from polyethylene and arranged at one end with a sealed tip. These cartridges are utilized with a dispenser which comprises a tube into which the cartridges fit closely, and a novel means is provided for advancing the paste material and discharging it through a special closure at the end of the dispenser.

BRIEF DESCRIPTION OF THE DRAWINGS

FIG. 1 is a front view, partially in section, of a dispenser in which a cartridge of paste product is contained.

FIG. 2 is a side view of the dispenser, partially broken away and illustrating the use of the roll-ball which gradually extrudes the entire contents of the cartridge tube.

FIG. 3 is a sectional view on the line 3—3 of FIG. 1.

FIG. 4 is a sectional view on the line 4—4 of FIG. 2.

FIG. 5 is a perspective view of a tube cartridge containing paste product which is adapted to be inserted in the dispenser of FIGS. 1 and 2.

DESCRIPTION OF THE PREFERRED EMBODIMENTS

Referring to FIGS. 1 and 2, the dispenser as shown comprises a solid tube 10 open at one end as shown at 11 and having a narrow opening 12 at the outer end, which is preferably hemispherical in shape, as indicated at 13, and has a closure 14 in the form of a clevis pivotally mounted at the center of curvature 17 of the hemispherical bottom 13. The closure has a smooth portion 15 and a side portion 16 which is serrated for the purpose hereinafter explained. The serrations are clearly shown in FIG. 1 at 16. The smooth central portion which is not serrated fits closely over the hemispherical curvature 13 and tightly closes the opening 12 when the closure 14 is swung into closed position.

The dispenser tube 10 has a slot 20 which extends from the outer open end to the center of curvature of the hemispherical end 13.

As shown in FIGS. 3 and 4, the tube cartridge 21 has a tip 22 at one end and has a hemispherical shape at 23, the curvature of which corresponds exactly to the curvature 13 of the dispenser. The opposite end of the cartridge is sealed at 24 after it is completely filled with the paste product to be dispensed.

The tube cartridge is adapted to be inserted into the dispenser with the tip 22 extending outwardly through the narrow slit opening 12 at the bottom of the dispenser, the closure 14 being swung to open position to enable the tip 22 of the tube cartridge to be inserted. The dispenser is longer than the tube cartridge so that space is left at the open end to receive a roll-ball extruder 25 which is pushed into the dispenser against the outer end of the tube cartridge as indicated in FIG. 1. The roll-ball extruder is pushed inwardly against the tube cartridge after the closure 14 has been swung across the opening 12 so that the serrations 16 act as a cutter and the closure functions to cut off the sealed projection 22 when the device is first put into use as shown in FIG. 3.

The closure continues in the open position shown in FIG. 2 as long as the paste substance is being extruded, as indicated at 26, but after each use the closure is swung back into central position where the serrated portions do not apply and the smooth surface acts to tightly fit over the hemispherical end 13 and close the opening 12.

It will be understood that on each occasion when the tube is used, the closure is swung to open position as shown in FIG. 2 and the roll-ball advanced, depending on the quantity of substance to be extruded.

The roll-ball extruder may be prevented from falling out at the rear of the dispenser by small lugs or projections 30 which are not large enough to prevent the roll-ball from being pushed into place as shown in FIG. 1.

A large number of tube cartridges may be kept on hand, in cold storage or refrigeration if necessary, and used one at a time in the dispenser.

The device is shown and described for purpose of illustration and may be modified by those skilled in this art without departing from the spirit of this invention.

I claim:

1. A cartridge tube and dispenser therefor comprising a non-flexible dispenser having tubular shape with a spherical bottom, a narrow transverse slit in the spherical bottom, a clevis-shaped closure pivoted at the center of curvature of the spherical bottom, a longitudinal slot in the side of the dispenser, said slot being narrow enough to hold the ball within the dispenser, said closure having a smooth spherical-shaped portion fitted against the spherical bottom of the dispenser and a serrated side portion, in combination with a thin flexible cartridge having a sealed end adapted to extend through the narrow transverse slot in the bottom of the dispenser and an extruder roll-ball adapted to be pushed into the dispenser tube and to push the contents of the cartridge tube out through the narrow slit in the bottom of the dispenser as the roll-ball is advanced into the dispenser, the serrated portions of the closure acting as cutters to initially sever the sealed bottom of the cartridge tube and thereby make the dispensing of the contents dependent upon the opening of the closure and the advancing of the roll-ball by contact of the user's finger therewith acting through the longitudinal slot in the dispenser.

2. A tube cartridge and dispenser combination comprising: a rigid dispenser having a spherically curved inner and outer bottom surface, a narrow cross slit opening formed through the bottom of said dispenser; a collapsible tube cartridge of thin flexible material filled with a paste and sealed at one end, said cartridge being contoured to fit the inside of said rigid dispenser and having at the opposite end, as a continuous extension, a flat severable tip of the same flexible material projecting through said cross slit opening and outwardly from the outer surface at the bottom extremity of said rigid dispenser; a roll-ball within the dispenser, a longitudinal slot in the side of the dispenser adapted to permit the user to contact the roll-ball but sufficiently narrow to hold the ball within the dispenser, said roll-ball being sized to substantially fit the inner bottom surface of the dispenser whereby the contents of the tube cartridge may be fully extruded; a sealing closure fitting closely against the outer surface of the dispenser bottom and immediately proximate the outward projecting tip for severing same at the time of initial closure of said tube cartridge.

References Cited

UNITED STATES PATENTS

| 1,618,377 | 2/1927 | Hamilton | 222—101 X |
| 2,085,446 | 6/1937 | Philippe | 222—386 |
| 2,659,517 | 11/1953 | Reinhardt | 222—82 |
| 2,705,579 | 4/1955 | Mason | 222—541 X |
| 2,801,028 | 7/1957 | Ward et al. | 222—105 X |
| 2,866,580 | 12/1958 | Nissen | 222—556 X |

ROBERT B. REEVES, Primary Examiner

N. L. STACK, JR., Assistant Examiner

U.S. Cl. X.R.

222—558, 83.5